F. K. & E. F. ATKINS.
CENTRIFUGAL FILTER PRESS.
APPLICATION FILED JUNE 1, 1908. RENEWED MAY 2, 1910.

980,859.

Patented Jan. 3, 1911.
6 SHEETS—SHEET 4.

Witnesses
Otto E. Hoddick
J. D. Thornburgh

F. K. Atkins
E. F. Atkins
Inventors

Attorney

UNITED STATES PATENT OFFICE.

FRANK K. ATKINS AND EARL F. ATKINS, OF DENVER, COLORADO; SAID EARL F. ATKINS ASSIGNOR TO SAID FRANK K. ATKINS.

CENTRIFUGAL FILTER-PRESS.

980,859.  Specification of Letters Patent.  Patented Jan. 3, 1911.

Application filed June 1, 1908, Serial No. 435,882. Renewed May 2, 1910. Serial No. 558,906.

*To all whom it may concern:*

Be it known that we, FRANK K. ATKINS and EARL F. ATKINS, both citizens of the United States, residing in the city and county of Denver and State of Colorado, have invented certain new and useful Improvements in Centrifugal Filter-Presses; and we do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to improvements in apparatus for filtering sedimentary solutions, and the separation of solids from liquids generally.

Our improved apparatus may be used not only as a dewatering machine, but for the extraction of slimes from the gold or silver-bearing cyanid solutions in cyanidation or the finely ground ores from the metal values in solution in any method for the treatment of ores by the use of solvents.

In our improved construction we employ a bowl mounted to rotate and fed from a centrally located standpipe arranged to rotate with the bowl and communicating with radially disposed distributing pipes leading from the lower extremity of the standpipe outwardly to the outer portion of the chamber of the bowl. Within the standpipe and made fast thereto is a screw thread or spiral blade open at both ends to permit the passage of the material to be treated. The centrifugal force developed in carrying the material from the discharge extremity of the standpipe outwardly through the distributing pipes, produces a pressure within the chamber, proportionate to the speed of the bowl's rotary travel. Within this bowl are located filtering elements or units which as disclosed in the specific construction illustrated in the drawing are vertically disposed and radially arranged, the bowl being equipped with suitable means for maintaining the filtering units in their respective positions. Each of these filtering elements consists of a suitable rigid body portion exteriorly provided on both sides with grooves or corrugations forming passage ways for the filtered liquid. These body portions are covered with a suitable filtering medium.

In the particular construction shown in the drawing, a layer of wire cloth is placed in direct contact with the body portions of the filtering elements while outside of this wire mesh material is placed canvas or other suitable woven fabric. The wire cloth or fabric, forms a support or backing for the outer layer of canvas and prevents the latter from collapsing or dipping into the corrugations of the surface of the body portion of the elements. It must be understood that any desired filtering medium may be employed in connection with our improved apparatus and that the claims which are not drawn to the specific construction and arrangement of the filtering elements or units, should be construed as of sufficient scope to cover filtering elements of any desired construction and arrangement.

The filtering medium when applied to the body of the filtering element, is tightly secured thereto, forming a complete envelop for the body member, whereby the entrance of liquid to the corrugations or grooves of the body member, must pass through the filtering medium. The interior of each filtering element is connected by means of a suitable pipe, with an annular chamber which as shown in the drawing is formed integral with the inner wall of the chamber and communicates with the atmosphere only by a valve-controlled pipe whereby atmospheric air may be cut off from communication with the interior of the filter at will. Each filtering element is also provided with an outlet pipe communicating with an exterior annularly arranged chamber formed integral with the outer wall of the bowl. Leading from this last named chamber are outlet pipes each terminating in a gooseneck which is so arranged that the liquid is trapped therein. This outlet pipe is also controlled by a valve. The chamber of the bowl outside of the filtering elements, also communicates at the top with the atmosphere by a valve-controlled pipe while the lower portion of the bowl is provided with valve-controlled discharge pipes for the escape of the solid material resulting from the process of filtration. Provision is made for operating all of the aforesaid valves by electro-magnets, whereby it is only necessary to operate a switch arm to open or close any valve. For instance all of the valves located in the goose-neck pipes may be simultaneously opened or closed while the air valves connected with the filtering elements and also with the chamber of the bowl are arranged to be simultaneously opened or closed. Furthermore as shown in the drawing the magnets for controlling these air valves are in the same circuit with the magnets for controlling the goose-neck valves, but the arrangement is such that when the goose-neck valves are closed the air valves are opened and vice versa. Any other desired arrangement, however, for the opening and closing of the goose-neck and air valves may of course be employed since it is evident that if desired they may be independently operated. As shown in the drawing the valves for the discharge of the solids from the bowl are arranged to be simultaneously opened and closed independently of the operation of the other valves.

Having briefly outlined our improved construction we will proceed to describe the same in detail reference being made to the accompanying drawing in which is illustrated an embodiment thereof.

In this drawing.

The same reference characters indicate the same parts in all the views.

Figure 1:
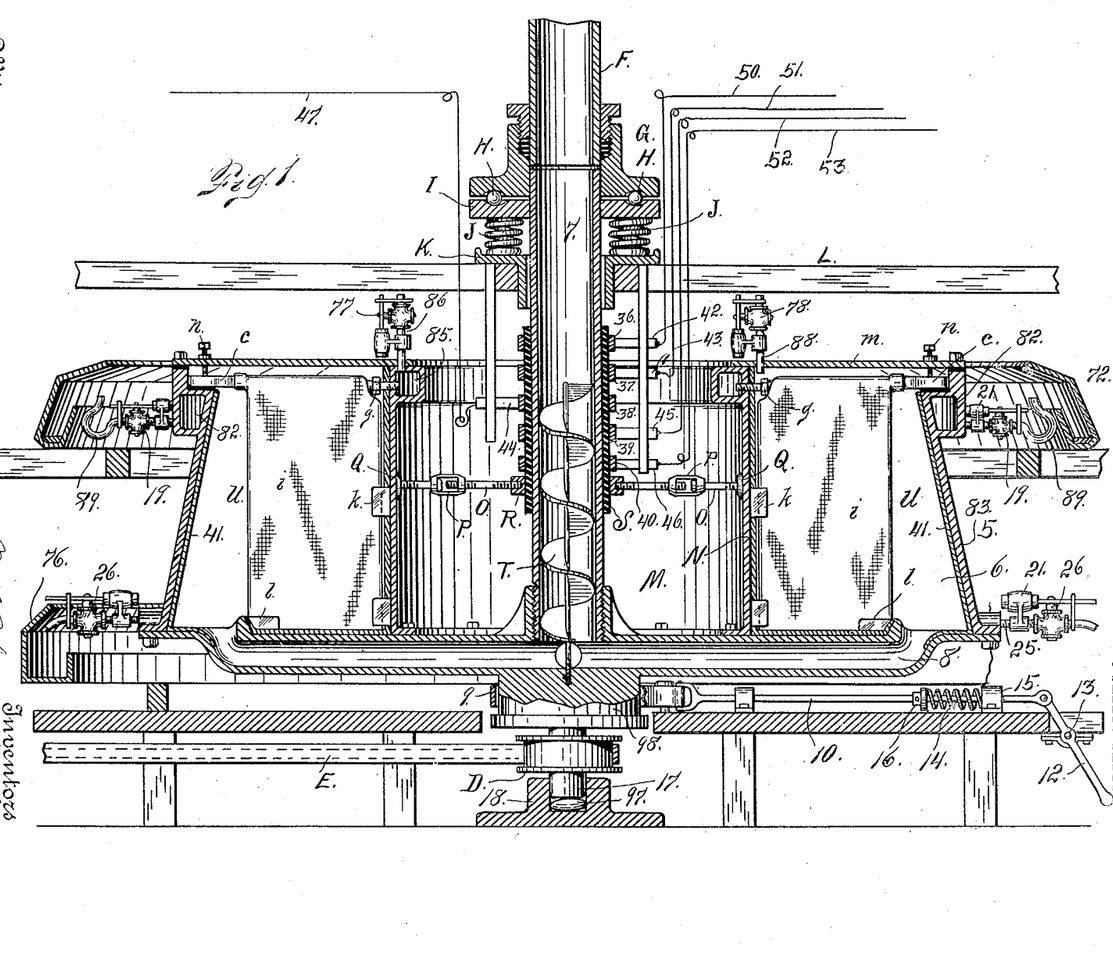
Figure 1 is a central vertical section taken through our improved filtering apparatus.
Figure 2:
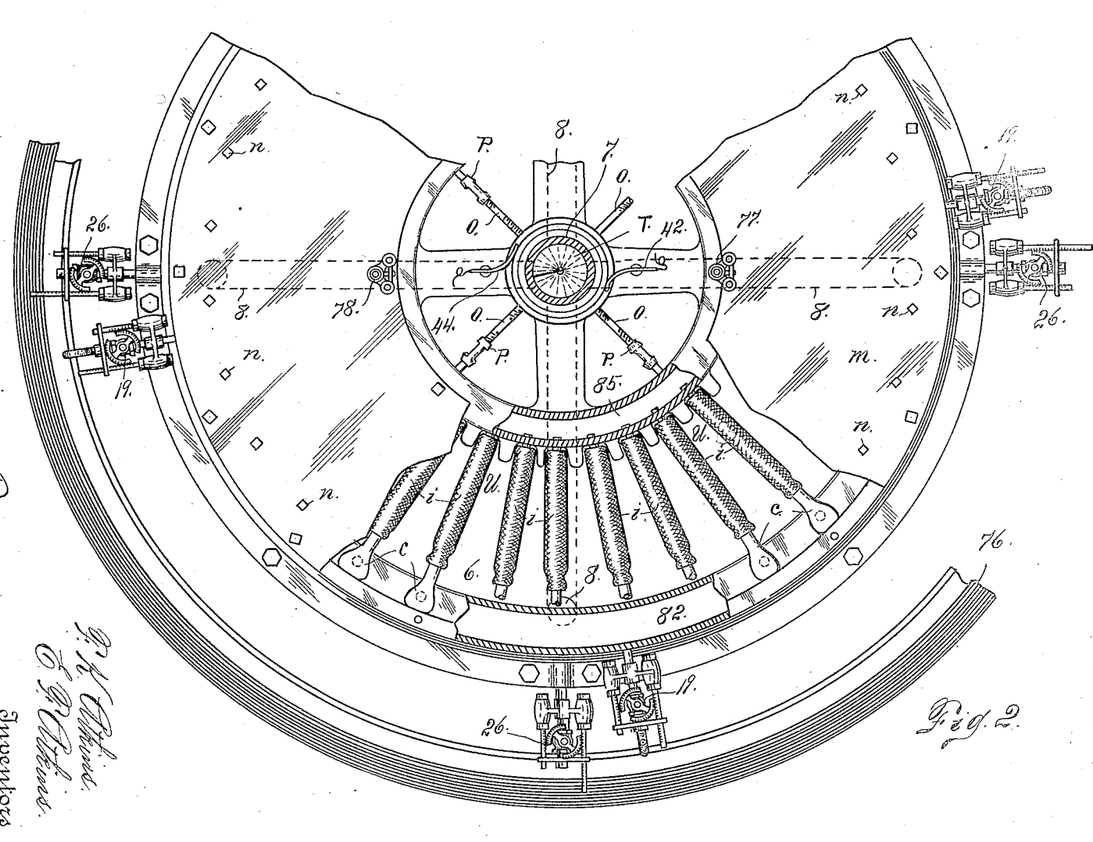
Fig. 2 is a top plan view of the same or a section cutting the standpipe above the top of the bowl and looking downwardly upon the latter, the top of the bowl being partly broken away to disclose the interior mechanism.

Let the numeral 5 designate a bowl mounted to rotate and having a chamber 6 communicating with a standpipe 7 by means of radially disposed distributing pipes 8 leading from the bottom of the standpipe to the outer portion of the bowl. The bottom of the bowl is provided with a drum 98 engaged by a band brake 9 for controlling the speed of the bowl. The band of this brake is connected with a rod 10 to whose outer extremity is connected a foot lever 12 fulcrumed at 13. The rod is surrounded by a coil spring 14 interposed between a bearing 15 and a stop 16 on the rod. This spring serves to automatically release the brake when the pressure employed to apply the brake is released. Below the brake drum is a journal 17 entering a recess formed in a step box 18. In the bottom of this recess is a double convex disk 97 which is engaged by the lower extremity of the journal. Between the step box and the brake drum is an operating pulley D connected with a belt E which may lead from a line shaft or any suitable motor (not shown) for imparting the rotary movement to the bowl. Arranged to register with the upper extremity of the standpipe is a stationary feed pipe F which enters a stuffing box G made fast to the upper extremity of the rotary standpipe. This stuffing box is provided with a circular groove forming a half bearing for balls H which also engage a similar groove formed in the adjacent face of a disk I supported by coil springs J whose lower extremities engage a plate K supported upon a stationary frame work L. By virtue of this construction the weight of the rotary bowl is distributed being partly supported upon the frame work L while the bottom journal 17 engages the double convex disk in the step box as heretofore described. The yielding plate I affords sufficient support to prevent undue pressure upon the disk in the step box. The weight on the bowl being thus distributed, prevents undue wear upon either of the bearings. The standpipe is braced and centered within the central space M formed by the inner wall N of the bowl, by two-part rods O whose members are connected by turn-buckles P. The outer extremities of these rods are connected with washers or bearing disks Q which engage the wall N, while their inner extremities are threaded into a ring R surrounding the standpipe and also an insulating sleeve S mounted on the standpipe for a purpose hereinafter explained.

Figure 5:
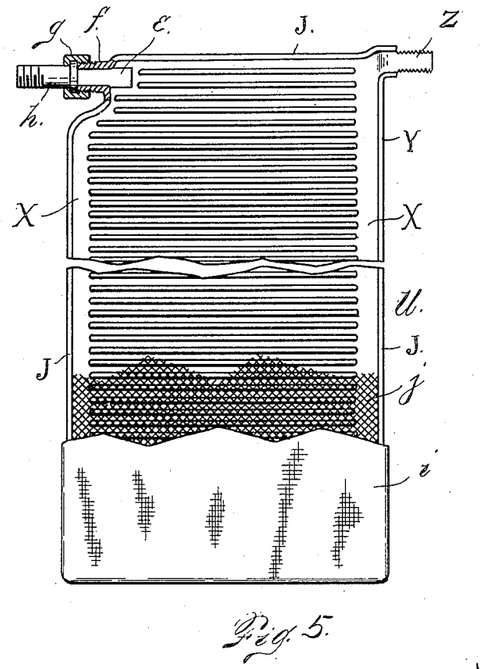
Fig. 5 is a detail view of one of the filtering elements or units, with the filtering medium partly broken away.
Figure 6:
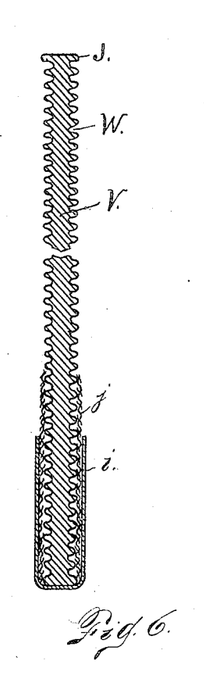
Fig. 6 is a longitudinal section of the same.

Mounted in the lower part of the standpipe is a spiral blade or screw thread T forming an open-ended spiral passage communicating with the inner extremities of the distributing pipes 8. Located within the chamber 6 of the bowl are vertically disposed, radially arranged filtering units or elements U each composed of a body member V having corrugated surfaces W. The corrugations or grooves of both of these surfaces extend horizontally and terminate at both extremities in vertical passages X where the horizontal ribs or corrugations are omitted. The outer edges of these plates are provided with ribs J. The upper outer corner of each plate is provided with a projection Z whose edges are threaded to receive a discharge pipe or nozzle a which is interiorly threaded as shown at b for the purpose. This part Z is a flat piece formed integral with the body of the plate V, and threaded on its upper and lower edges to connect with the interiorly threaded nozzle a. Hence this element divides the discharge pipe or nozzle a, and the liquid escaping from the filtering unit passes out of the unit through the nozzle on both sides of the element Z. This discharge nozzle is enlarged at its outer extremity as shown at c and provided with a depending outlet nipple d communicating with a circumferential chamber 82 formed integral with the outer wall 83 of the bowl. The opposite upper corner of the filter plate is provided with an opening e and is formed into a short exteriorly threaded nipple f adapted to receive an interiorly threaded sleeve g swiveled on a short pipe h communicating with a chamber 85 formed integral with the inner wall N of the bowl. Each filter plate is enveloped in a canvas bag or covering i which is so attached as to completely cover the plate and prevent the entrance of liquid from the chamber 6 except through the filtering medium. It is preferred to apply wire mesh fabric j to the opposite sides of the filter plate to form a support or backing for the canvas, to prevent the latter from dipping into the grooves and passages of the plate. These filtering elements, are dropped into the bowl from above, their inner edges being engaged on opposite sides by lugs k mounted on the wall N of the bowl while their outer edges pass between bottom lugs l formed on the bowl. These filter units are further secured in place by means of set screws n threaded into the removable top m of the bowl, their inner extremities bearing upon the upper surface of the discharge nozzles c.

Connected with the chamber 85 is a pipe 86 controlled by a valve 77. Connected with the chamber 6 of the bowl is a pipe 88 controlled by a valve 78.

Connected with the chamber 82, are outlet pipes 87 each terminating in a goose-neck 89 and controlled by a valve 19 located between the extremities of the pipe.

Figure 7:
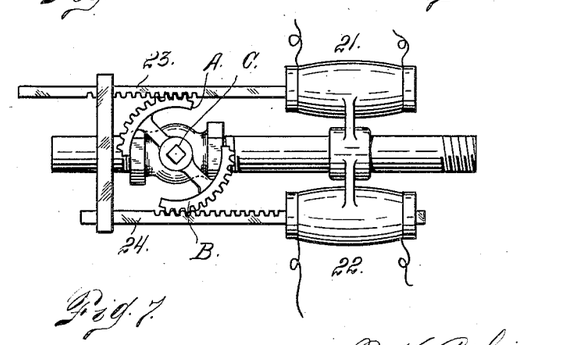
Fig. 7 is a top view in detail showing the electro-magnetic means for operating the various valves employed in connection with the apparatus, the parts being shown on a larger scale than in the other views.

Each valve 19 is controlled by two solenoids 21 and 22, provided with bars or cores 23 and 24, mounted to reciprocate within the solenoid coils. Each of these cores is provided with rack teeth, and they engage segments A and B of a gear, fast on the stem C of the valve. The cores or reciprocating bars of the solenoids thus become toothed racks for the opening and closing of a valve 19, and as each of these valves 19 is operated in the same way, the description of the operating mechanism for one valve will suffice. By virtue of this construction for opening and closing the valve, it may be assumed that when the solenoid 21 is energized, the rack bar 23 is drawn inwardly, and acting upon the gear segment A, imparts a sufficient movement to the valve 19 to open the same, the gear being connected with the stem C of the valve, as heretofore explained. Now, when it is desired to close the valve, the magnet 21 is deënergized, and the circuit closed through the magnet 22, whereby the rack bar 24 will be moved inwardly and reverse the movement of the valve, heretofore explained, and close the same. The opening or closing of all of the valves 19 may be simultaneously effected by the simple movement of a switch arm, while the bowl is still in motion. This is an important feature of our improved construction.

The bowl is provided at its bottom with discharge pipes 25, controlled by valves 26, which are opened and closed in the same manner as the valves 19. That is to say, two magnets 21 and 22 are employed to alternately actuate rack bars 23 and 24, which act on gear segments A and B, connected with the stem C of the valve. When the circuit of one magnet is closed, and the magnet is energized, the rack bar is moved inwardly and acting on the gear turns the valve in the direction to open the same; while, when the other magnet is energized, the movement of the valve is reversed.

It will be understood that before energizing either magnet the circuit is broken through the other magnet, whereby the latter is deënergized, thus allowing its rack bar to move outwardly without resistance in response to the inward movement of the other bar. The pipe 25 for the removal of the solids from the bowl, is controlled in the same manner; and hence, a description of the mechanism for operating one valve 26, is sufficient, for the reason that the mechanism for operating each valve is the same or identical. It may be stated that the valve 26 is also opened and closed while the bowl is in motion, by the use of ordinary means for making and breaking the electric circuits in which the solenoids or magnets are located.

The air valves 77 and 78 are controlled by solenoids in the same manner as the valves 19 and 26. As shown in the drawing and hereinafter described more in detail, the magnets which control the valves 77 and 78 are located in the same circuit as the magnets that control the valves 19, but are so arranged that the valves 77 and 78 are opened simultaneously with the closing of the valves 19 and closed simultaneously with the opening of the valves 19, though as heretofore intimated the air valves may if desired be opened and closed independently of the valves 19 and also independently of each other.

In order to accomplish the operation of the valves in the manner heretofore explained, the standpipe 7 is equipped with a number of distinct rings, which we will designate as 36, 37, 38, 39 and 40 respectively. These rings are insulated from each other, as shown at S, and are respectively engaged by stationary brushes, or electrical contacts 42, 43, 44, 45 and 46. The brush 42 is located in the electrical circuit of the magnets 21 which act to open all of the valves 26, while the brush 43 is located in the circuit of the magnets 22, which act to close all of the valves 26. The brush 45 is located in the circuit of the magnets 21, which serve to open all of the valves 19 and close both valves 77 and 78; while the brush 46 is located in the circuit of the magnets 22, which serve to close all of the valves 19 and open the valves 77 and 78. The brush 44 is in electrical communication by means of a conductor 47, with a pole 48 of an electrical source 49, which is common to all of the circuits (see Fig. 11). Conductors 50, 51, 52 and 53 lead from switch arms 1, 2, 3 and 4 respectively of a switch board 84 to the brushes 42, 43, 45 and 46 respectively. These circuits will be understood from Fig. 11, a diagrammatic view, to which special reference will now be made. In this view the inner series of circles represent the rings 36, 37, 38, 39 and 40. From these rings, conductors 54, 55, 56, 57 and 58, lead respectively to other conductors represented by an outer series of circles and designated 59, 60, 61, 62 and 63 respectively. From the circular conductor 59, lead branch conductors 64 to one terminal of all of the magnets 21 for opening the valves 26; while the other terminal of each of said magnets is connected by a conductor 65 with the circular conductor 61, which is connected by means of the conductor 56, with the ring 38, which is engaged by the brush 44, from which leads the conductor 47 to the pole 48 of the electrical source 49. From the opposite pole 66 of this source, leads a conductor 67 to a contact 68, forming a part of the switch board 84. Now, when the switch arm 1 is moved to engagement with the contact 68, the circuit is closed through all of the magnets 21 of the valves 26, and those magnets being energized serve to open the said valves by moving the rack bar 23 inwardly, and actuating the segment A connected with the valve stem C (see Fig. 7); but when it is desired to close the said valves, the switch arm 1 is disengaged from the contact 68 and the switch arm 2 is thrown into engagement therewith, in which event the path of the current may be traced through the magnet 22 of the valves 26, as follows: From the switch arm 2 the current may be said to pass through the conductor 51 to the brush 43 of the contact ring 37, and thence through the conductor 55 to the circular conductor 60, and thence through a conductor 69 to one terminal of the magnet 22 of the valve 26, thence to the magnet coil, and from the opposite terminal of the magnet through the conductor 65 to the circular conductor 61, and thence through the conductor 56 to the ring contact 38, thence through the brush 44 and the conductor 47 to the pole 48 of the electrical source 49, and thence from said source through the conductor 67 to the switch board contact 68.

Figure 11:
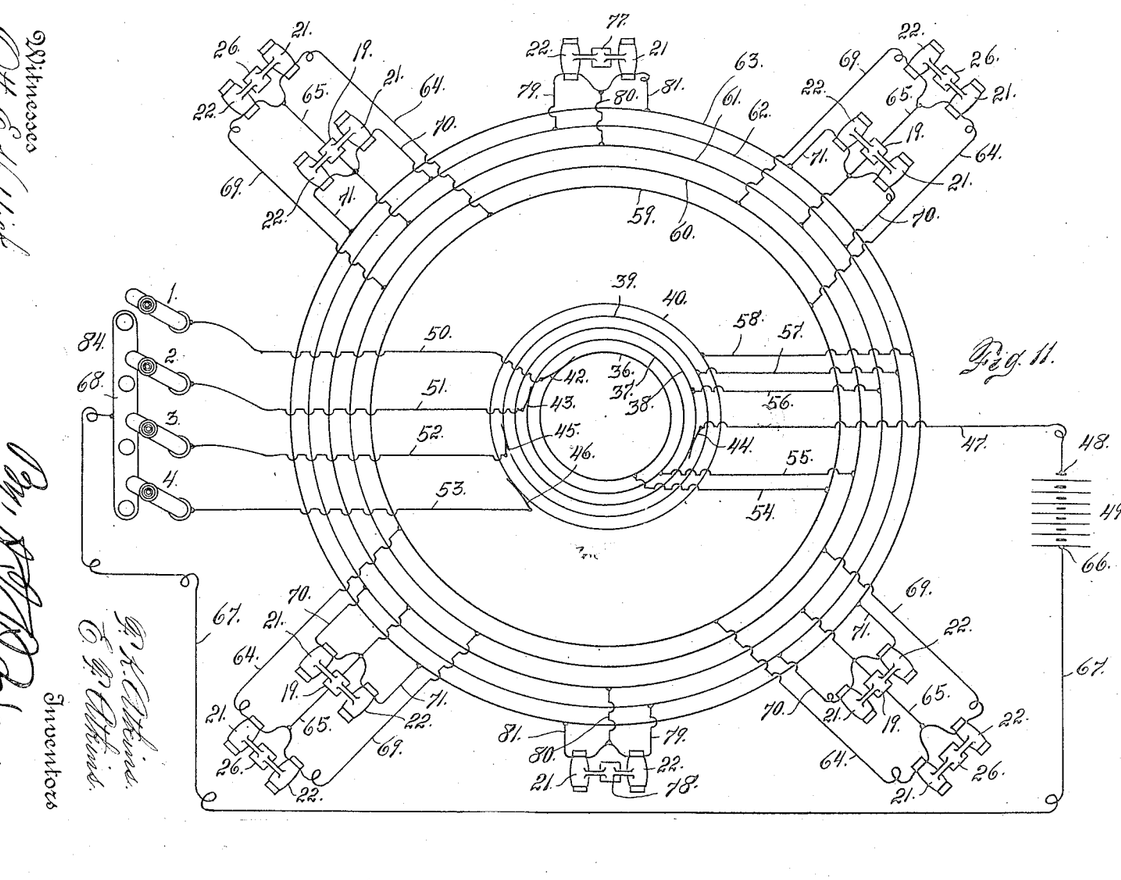
Fig. 11 is a diagrammatic view illustrating the circuits in which are located the electro-magnets for opening and closing the various valves connected with the apparatus.

Assuming now that it is desired to open the valves 19, the switch arm 3 is thrown into engagement with the contact 68 of the switch board; in which event the path of the current may be said to be as follows: from the switch arm 3 through the conductor 52, the brush 45, the contact ring 39, the conductor 57, the circular conductor 62, a conductor 70 leading to one terminal of the magnet 21 of the valve 19, from the opposite terminal of the magnet to the conductor 65, thence to the circular conductor 61, thence through the conductor 56, the contact ring 38, the brush 44, the conductor 47, the electrical source 49 and the conductor 67 to the switch board contact 68.

The valves 77 and 78 being in the same circuit with the valves 19, are arranged to be closed simultaneously with the opening of the valves 19. In this case the path of the current is the same as just described until the circular conductor 62 is reached, in which event the current passes through a conductor 79 to a magnet 22, and from the terminal of the last named magnet, through a conductor 80 to the circular conductor 61, completing the circuit in the same manner as heretofore described and which will be readily understood by reference to Fig. 11. This description applies to both valves 77 and 78. Again, if it is desired to close the valves 19, the switch arm 3 is disengaged from the contact 68, and the switch arm 4 thrown into engagement therewith, in which event the path of the current may be said to be as follows; from the switch arm 4 through the conductor 53, the brush 46, the contact ring 40, the conductor 58, the circular conductor 63, a conductor 71 connected with one terminal of the magnet 22, thence through the coil of said magnet, and from the opposite terminal of the said coil to the conductor 65, and thence through the conductors 61 and 56 to the contact ring 38, the brush 44, the conductor 47, the electrical source 49 and thence through the conductor 67 to the contact 68 of the switch board.

Simultaneously with the closing of the valves 19, the valves 77 and 78 are opened and the path of the current in each case is the same until the circular conductor 63 is reached, in which event the current passes through a conductor 81 to one terminal of each magnet 21 and from the opposite terminal of said magnet through the conductor 80, to the circular conductor 61, thence completing the circuit in the same manner as heretofore described.

From the foregoing description the operation of our improved machine will be readily understood. If desired the bowl may be left stationary and gravity or pump pressure employed in feeding the material to the bowl, whereby sufficient pressure is produced to force the liquid through the filtering medium of the filtering units and cause the same to escape through the goosenecks into the upper trough 72 of the structure. The stationary feed pipe, it will be observed, is arranged so as to feed the material into the bowl under gravity, or pump pressure when such may be available. When used in this manner, the accumulation of solids upon the outer surface of the filtering units, will necessarily occur. In order to remove these solids, the valves in pipes 25 are opened and the machine may be rotated and if there is a tendency for the solids to pack against the outer wall, we first impart the rotary motion to the material by revolving the bowl, then the band brake 9 is brought in contact with the shaft which suddenly checks the speed of the bowl, and this impels the solids to break loose from the outer wall. Thereafter water is fed into the bowl through the standpipe; the bowl continues to revolve and the water disintegrates the solids permitting them to be discharged through the outlet pipes under centrifugal force. In this manner the solids are readily released from the bowl. During the discharge of the solids the filtering operation is of course suspended. Thus when gravity pressure is available we can make the separation while the machine is at rest and apply the power only for the purpose of clearing out the solids.

When gravity pressure is not available filtration is done by merely rotating the bowl in which the following devices are important in creating a powerful pressure of the liquid upon the filtering surfaces within the bowl. The distributing pipes containing their columns of liquid, extending practically in line with the resultant force, develop under the rotary speed a strong pressure against the filter. By adjusting the length of the distributing pipes and regulating the speed of the bowl, any desired pressure may be had and high pressures, therefore, may be readily obtained; and it may be further stated that the distributing pipes are important since they compel the materials to be filtered, to move with the same rotary speed as the bowl. The open ended screw in the standpipe revolving as it does with the bowl and expending its force against the confined liquid exerts an induced pressure against the filter surfaces.

The arrangement of the filter units and their communication with chambers 82 and 85 and valves 77 and 19 make the conditions, when intelligently operated together with valve 78, whereby a vacuum is maintained within the filter units, and a vacuum suction pressure, equivalent in actual practice to about twelve pounds per square inch of filter area, is obtained. To attain such results, however, it is necessary to prime the bowl in manner following: If desired, the bowl may be primed while at rest by feeding in the unfiltered solution through the stationary feed pipe and standpipe, the valves controlling the pipes for discharging the solids and filtered solution, being closed and air valves 77 and 78 being opened; this results in filling the chamber 6 with water, that portion exterior to the filtering units being filled with unfiltered solution, and the interior thereof with filtered solution. When the bowl is fully primed, the air valves are closed, valves 19 are opened and the bowl rotated. Filtration then proceeds at a rapid rate, the pressure against the filtering medium being produced from the various causes, as follows: First, such gravity pressure as may be applied by the height of the vertical column of the combined feed pipe and standpipe; second, that produced by the rotary screw within the standpipe; third, the direct pressure resulting from the increased weight of the materials under the application of centrifugal force; fourth, the vacuum suction pressure against the surfaces of the filtering medium, as elsewhere referred to herein. Provision is made, however, whereby the bowl may be continuously operated thereby avoiding the necessity of stopping the bowl either to prime the same or to clean out the solids in the manner following: Assuming that the bowl is revolving at the desired rate of speed, the unfiltered solution is fed into the bowl, valves 19 and 26 being closed and air valves 77 and 78 being open. The feed is continued until the air is ejected from the machine and the chamber filled with liquid, the exterior of the filter units with the unfiltered, and the interior including chambers 82 and 85 and pipes 87 with the filtered solution. When the liquid discharges at both valves 77 and 78 the same are closed and valves 19 are opened. Under the centrifugal force we employ, the weight of water in the line of the resultant force, is twice or more times mercury under the force of gravity, with the result that the filtered water is impelled to flow outwardly from the interior of the filter and chambers and takes its place in the goose-necks and extends backwardly in the pipes only to about the point *w* (see Fig. 3), where it is held in place by atmospheric pressure. Thenceforth water discharges at the goose-necks in like quantity only as it percolates through the filter, a vacuum being maintained in the interior thereof.

By means of the electro-magnets whereby the valves may be opened and closed while the machine is revolving, it is possible to operate the machine continuously, cutting off the feed only while the solids are being discharged; the only occasion for stopping the machine being to replace a filter that is worn out or faulty. After the bowl has once attained the required speed, comparatively little power is needed to keep it revolving, hence the desired pressure is economically maintained. It may also be stated that the machine is designed to give the greatest possible filtering area within the revolving chamber, and the filter units are in such relation to the resultant force that the solids which otherwise would accumulate against the filtering surfaces are carried outwardly and accumulate upon the outer wall of the bowl. Thus centrifugal force materially aids in the work of separation.

When the press is used for separating the slimes from the cyanid solution in cyanidation and where the cake of solids formed on the outer wall contains gold or silver values in solution in the moisture therein, the said cake may be washed before discharging the same by feeding in clear water through the feed pipe valves 26, 77 and 78 being closed, and valves 19 opened, whereby the water in discharging from the machine carries off the values in diluted form. The same method is applied in washing the sludge in the sugar factories.

In case solvents are used which attack the metal of the bowl, the same may be lined with enamel, glass, lead or other material to protect the same. This lining is designated 41 in the drawing.

Attention is called to the fact that the centrifugal force due to the rotary movement of the bowl, in carrying the solids outwardly against the inner surface of the outer walls, so effectually relieves the exterior surface of the filtering units as to keep them continuously almost clean, thereby permitting rapid percolation of the liquid through the filtering medium during the filtering operation.

Figure 8:
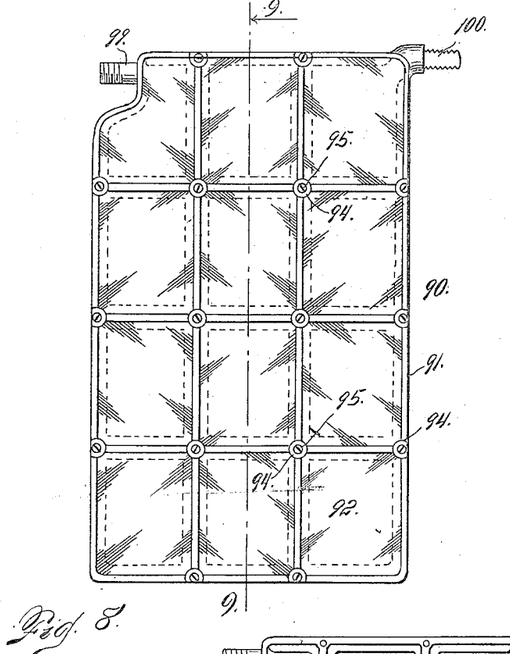
Fig. 8 is a side elevation of a modified form of filtering element or unit.
Figure 9:
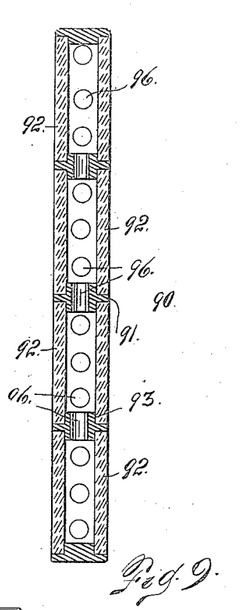
Fig. 9 is a section taken on the line 9—9 Fig. 8.
Figure 10:
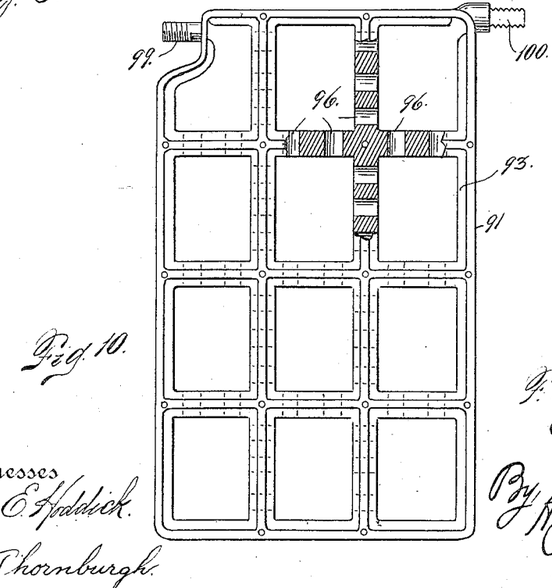
Fig. 10 is a detail view of the filter frame or body of the form of construction shown in Figs. 8 and 9. In this view the filtering medium which it is assumed is composed of stone or other suitable rigid porous material, is removed.

When it is desired to use the filter for the clarification of water for drinking purposes it will be found desirable to employ a filtering medium composed of porous stone. A filtering unit or element of this character is illustrated in Figs. 8 to 10 inclusive. In these views let the numeral 90 designate a filtering unit considered in its entirety. This unit is composed of a rigid frame 91 having intersecting vertical and horizontal bars shaped to receive sections 92 of the stone filtering medium. These filtering sections are placed in the frame which is cut out to receive them as shown at 93. They are secured at the corners by washers 94 which overlap the filtering sections and are held in place by fastening screws 95. The intersecting bars which constitute the interior of the frame are perforated as shown at 96 whereby the spaces covered by the filtering sections applied to the opposite sides of the frame are intercommunicating. These filtering elements or units may be arranged in the bowl in substantially the same manner as the filtering units U already described. Each frame is provided at its upper left hand corner with an exteriorly threaded nipple 99, while the opposite corner is provided with a flat plate 100 threaded on its opposite edges to receive the discharge pipe or nozzle *a*. In the operation of the filtering apparatus with units of this character the stone filtering sections 92 constitute the filtering medium as heretofore explained and take the place of the filtering medium employed in the filtering units U in the other form of construction.

The solid material which escapes through the outlet pipes 25 as heretofore explained, enters the lower waste trough 76 as will be readily understood.

Figures 3, 4:
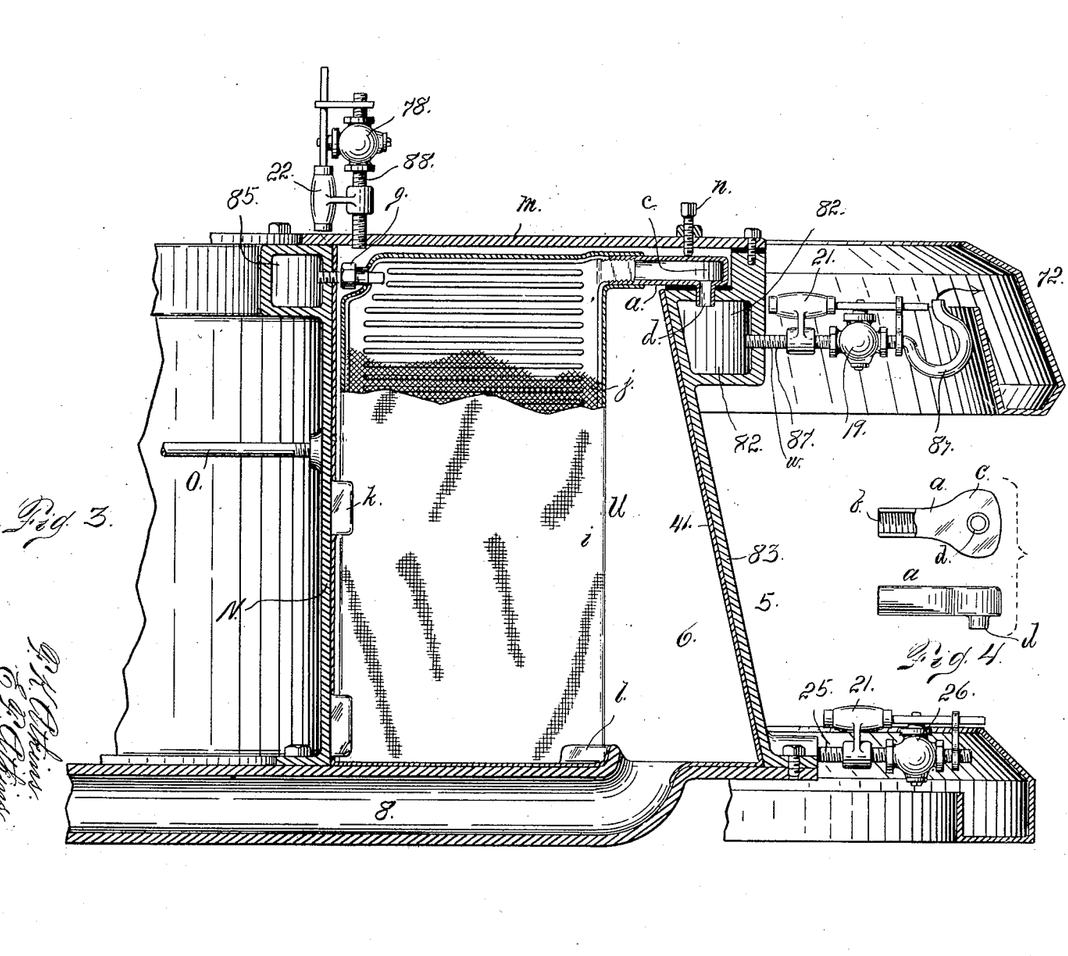
Fig. 3 is a fragmentary sectional view similar to Fig. 1 with the parts on a larger scale.
Fig. 4 shows a top and side elevation of an outlet pipe or discharge nozzle connected with each filtering element.

Attention is directed to the fact that the arrangement of the various parts of the filter press is such that the filters may be washed while in the machine by passing clear water through the filter medium under pressure reversely from the direction the fluid travels during filtration. This is accomplished in manner following while the machine is at rest. Valves 26 are opened and valves 77 closed; clear water is then fed into one or more of the goosenecks, as shown in Figs. 1 and 4, by clamping a hose (not shown) at the outer end of the gooseneck, which hose may be connected with a source of supply (not shown), the valves in the one or more pipes 87, leading to the goosenecks which have such hose connection are opened and the valves in any of the pipes 87, where the goosenecks have no such hose connection, are closed. The water is in this manner fed into the interior of each filtering element under such pressure as may be desirable to apply, and inasmuch as pipes 25 drain chamber 6, which relieve the exterior of the filtering elements from pressure said water is forced through the filtering medium outwardly, and this may be continued until the same are thoroughly cleaned without removing them from the bowl.

Having thus described our invention, what we claim is:

1. In filtering apparatus, the combination of a bowl, a standpipe for feeding the material to be treated to the bowl, filtering elements radially arranged within the chamber of the bowl, the said elements comprising a channeled body part, and a covering composed of a suitable filtering medium, and a pipe connected with the interior of each filtering element for conveying the filtered solution through the outer wall of the bowl.

2. A filter comprising a bowl, a standpipe, distributing pipes leading from the bottom of the standpipe to the outer portion of the chamber of the bowl, filtering units radially arranged within the bowl, each comprising a body member and an exterior covering forming a filtering medium, the construction of the body part being such as to permit the entrance of the liquid to the interior of each filtering unit, means for subjecting the unfiltered material within the bowl to the necessary pressure for forcing the liquid through the filtering medium, and a pipe connected with the interior of each filtering element for conveying the filtered solution through the outer wall of the bowl.

3. In a centrifugal filter press, the combination of a bowl mounted to rotate, means for feeding the unfiltered solution to the bowl, filtering units radially arranged within the bowl and composed of a body part and a filter medium covering, the body of the filtering unit being channeled to permit the entrance of the filtered liquid, and outlet pipes protruding through the outer wall of the bowl for the filtered solution, and connected with the interior of the respective filtering elements, substantially as described.

4. A centrifugal filter press, comprising a bowl mounted to rotate, a standpipe in communication with the bowl, distributing pipes connected with the bottom of the standpipe and leading outwardly therefrom and communicating with the outer portion of the chamber of the bowl, hollow filtering elements radially arranged within the bowl and provided with an exterior covering forming a suitable filtering medium, and a discharge pipe protruding through the outer wall in communication with the interior of each filtering unit, substantially as described.

5. In a centrifugal filter press, the combination of a rotary bowl, means for delivering the solution to be filtered, hollow filtering units arranged within the bowl and covered with a suitable filtering medium, the interior of the filtering units being in communication with the atmosphere by a valve-controlled passage and provided with valve-controlled discharge outlets also communicating with the interior of the respective filtering units, substantially as described.

6. A centrifugal filter press, comprising a rotary bowl, hollow radially disposed filtering elements mounted in the bowl, each filtering element having an exterior filtering medium through which the filtered liquid must pass to the interior of the filtering element, pipes for the discharge of the filtered solution from the respective filtering elements, the said pipes being provided with valves for opening and closing the same, substantially as described.

7. In a centrifugal filter press, the combination of a rotary bowl, radially disposed filtering elements mounted in the bowl, a standpipe centrally connected with the bottom of the bowl, distributing pipes leading outwardly from the bottom of the standpipe and communicating with the outer part of the bowl, each filtering element or unit comprising a rigid body covered with a suitable filtering medium, the body part being open to form a space for the filtered liquid, a valve-controlled air pipe for controlling the passage of air to or its exit from the interior of a filtering unit, and a valve-controlled outlet pipe also communicating with the interior of each filtering unit, substantially as described.

8. A centrifugal filter press comprising a rotary bowl, filtering elements located therein, means for feeding the material to be treated to the bowl, and a liquid trap for cutting off the air from the interior of each filtering element under the action of centrifugal force, while the liquid is free to escape therefrom, said trap being formed by bending the outlet pipe upwardly and inwardly at its outer extremity, substantially as described.

9. The combination with a bowl mounted to rotate, of hollow filtering elements or units arranged within the bowl and provided with outlets for the escape of the filtered liquid under the action of centrifugal force, and means for cutting off the air from the interior of the filtering units comprising a liquid trap for each unit under the action of centrifugal force, said trap being formed by bending the outlet pipe upwardly and inwardly at its outer extremity, substantially as described.

10. The combination of a bowl mounted to rotate, hollow filtering elements mounted in the bowl, each element having an outlet for the filtered liquid including a pipe bent upwardly and inwardly at its outer extremity, means for cutting off the air from the various filtering elements, and a standpipe for delivering the material to be treated to the bowl.

11. The combination of a rotary bowl, a standpipe centrally connected with the bowl, distributing pipes leading outwardly from the bottom of the standpipe and terminating at the bottom of the outer portion of the chamber of the bowl, whereby the liquid delivered to the bowl under a pressure due to the height of the standpipe of the centrifugal force imparted to the liquid by the bowl's rotary action, hollow filtering elements located within the bowl, provided with outlets for the discharge of the filtered liquid, each outlet including a pipe bent upwardly and inwardly at its outer extremity, and means for cutting off atmospheric air from the interior of the filtering elements.

12. In a filter press, the combination with a bowl mounted to rotate, means for delivering the material to be treated under pressure to the bowl, a filter located within the bowl and provided with a discharge outlet for the filtered liquid, including a pipe bent upwardly and inwardly at its outer extremity, and means for cutting off the air from the interior of the filter.

13. The combination of a bowl mounted to rotate, filtering units mounted within the bowl, an annular air chamber with which all of the filtering units are in communication, means for cutting off the air from the said chamber, whereby atmospheric air is cut off from the interior of the filter, the filtering units being provided with discharge outlets for the filtered liquid, an annular chamber with which said outlets communicate, and valve-controlled outlet pipes leading from said last named chamber and terminating in goose-necks, substantially as described.

14. The combination of a rotary bowl, circular chambers surrounding the bowl both interiorly and exteriorly, filtering units mounted within the bowl and in communication at one extremity with the interior circular chamber and at the other extremity with the exterior chamber, discharge pipes leading from the exterior chamber and terminating in goosenecks, and means for cutting off the air from the interior circular chamber.

15. The combination of a rotary bowl, a filter located therein, an outlet communicating with the filter for the discharge of the filtered solution said outlet including a gooseneck-shaped pipe, and an outlet connected with the bowl for the discharge of the solids which accumulate therein during the performance of the filtering function, substantially as described.

16. A bowl mounted to rotate, a filter located within the bowl, a valve-controlled outlet for the escape of the filtered solution, a valve-controlled vent for the interior of the filter, and electro-magnetic means for opening and closing the valve in the escape pipe for the filtered solution, simultaneously with the operation of the valve in the vent pipe, substantially as described.

17. A bowl mounted to rotate, a hollow filter therein, a valve-controlled outlet for the filtered solution, a valve controlled vent connected with the filter or in communication with the filter, and electro-magnetic means for opening the valve in the liquid discharge pipe simultaneously with the closing of the valve in the vent pipe and vice versa, substantially as described.

18. The combination of a rotary bowl, a hollow filter located therein, a discharge pipe for the filtered liquid, a valve controlling said pipe, a valve-controlled vent pipe in communication with the filter, a valve-controlled vent pipe in communication with the chamber of the bowl, and electro-magnetic means for opening the liquid discharge pipe simultaneously with the closing of the valves in the two vent pipes or vice versa, substantially as described.

19. The combination of a rotary bowl, a hollow filter located therein, an outlet from the filter for the discharge of the filtered liquid under the influence of the centrifugal force, a valve-controlled outlet in communication with the bowl for the discharge of the solid material, and electro-magnetic means for opening and closing the valve in the discharge pipe for the solids, substantially as described.

20. The combination of a bowl mounted to rotate, an imperforate standpipe communicating with the bowl at its lower extremity, a screw thread fast in the standpipe and forming an open ended spiral passage, the standpipe being connected to rotate with the bowl.

21. The combination of a bowl mounted to rotate, a filter located within the bowl, an imperforate standpipe connected to rotate with the bowl, distributing pipes leading from the bottom of the standpipe and communicating with the outer portion of the bowl, the standpipe having a screw thread located therein and forming a spiral passage open at both ends and communicating with the distributing pipes.

22. In a filter apparatus, the combination of a bowl mounted to rotate, filtering units located within the bowl, discharge pipes for the escape of the filtered solution from the filters said discharge pipes terminating in goosenecks, a stationary trough for receiving the discharge from the pipes, pipes connected with the bowl for the discharge of the solids, and a stationary trough into which the solids are delivered by the said pipes, substantially as described.

23. In a centrifugal filter press, the combination of a bowl mounted to rotate, means for feeding the unfiltered solution to the bowl, filtering units arranged within the bowl, and outlet pipes for the filtered solution connected with the interior of the respective filtering elements and having goosenecks at their outer extremities.

24. In a centrifugal filter press, the combination of a bowl mounted to rotate, means for feeding the unfiltered solution to the bowl, filtering units arranged within the bowl, each composed of a body part, and a canvas bag covering forming the filtering medium, the body of each filtering unit being fashioned to permit the entrance of the filtered liquid, and outlet pipes connected with the interior of the respective filtering units, and terminating in goosenecks.

25. In a centrifugal filter press, the combination of a bowl mounted to rotate, means for feeding the unfiltered solution to the bowl, filtering units arranged within the bowl, each composed of a body part, an inner covering of wire mesh material, and an outer covering of canvas, the body part of each filtering unit being fashioned to permit the entrance of the filtered liquid, and outlet pipes for the filtered solution, connected with the interior of the respective filtering elements, and terminating in goosenecks.

In testimony whereof we affix our signatures in presence of two witnesses.

FRANK K. ATKINS.
EARL F. ATKINS.

Witnesses for Frank K. Atkins:
DENA NELSON,
A. J. O'BRIEN.

Witnesses for Earl F. Atkins:
C. A. HEGELHEIMER,
ASA A. WALLACE.